(12) United States Patent
Chinniah et al.

(10) Patent No.: US 7,275,849 B2
(45) Date of Patent: Oct. 2, 2007

(54) LED REPLACEMENT BULB

(75) Inventors: Jeyachandrabose Chinniah, Canton, MI (US); Jeffrey Allen Erion, Plymouth, MI (US); Chris Eichelberger, Livonia, MI (US); John Li, Northville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 71 days.

(21) Appl. No.: 11/066,352

(22) Filed: Feb. 25, 2005

(65) Prior Publication Data

US 2006/0193137 A1 Aug. 31, 2006

(51) Int. Cl.
F21V 7/04 (2006.01)
(52) U.S. Cl. ............... 362/555; 362/326; 362/327; 362/296; 362/307
(58) Field of Classification Search ............... 362/555, 362/559–560, 582, 511, 551, 326–327, 347, 362/350, 335, 336–337, 339, 308, 343, 296, 362/307; 359/726–731
See application file for complete search history.

(56) References Cited

U.S. PATENT DOCUMENTS

| | | | |
|---|---|---|---|
| 2,215,900 A | 9/1940 | Bitner | |
| 2,224,178 A | 12/1940 | Bitner | |
| 2,254,962 A | 9/1941 | Harris et al. | |
| 4,753,520 A | 6/1988 | Silverglate | |
| 4,770,514 A | 9/1988 | Silverglate | |
| 4,826,273 A | 5/1989 | Tinder et al. | |
| 5,042,928 A | 8/1991 | Richards | |
| 5,343,330 A | 8/1994 | Hoffman et al. | |
| 5,757,557 A | 5/1998 | Medvedev et al. | |
| 6,547,423 B2 | 4/2003 | Marshall et al. | |
| 6,560,038 B1 | 5/2003 | Parkyn, Jr. et al. | |
| 6,679,621 B2 * | 1/2004 | West et al. | 362/327 |
| 6,724,543 B1 | 4/2004 | Chinniah et al. | |
| 6,755,556 B2 | 6/2004 | Gasquet et al. | |
| 6,819,505 B1 | 11/2004 | Cassarly et al. | |
| 6,819,506 B1 | 11/2004 | Taylor et al. | |
| 6,951,415 B2 * | 10/2005 | Amano et al. | 362/520 |
| 6,972,439 B1 * | 12/2005 | Kim et al. | 257/98 |
| 7,168,839 B2 * | 1/2007 | Chinniah et al. | 362/555 |
| 2003/0007359 A1 | 1/2003 | Sugawara et al. | |
| 2003/0075167 A1 | 4/2003 | Dominguez et al. | |
| 2004/0012976 A1 | 1/2004 | Amano | |
| 2004/0070855 A1 | 4/2004 | Benitez et al. | |
| 2004/0114393 A1 | 6/2004 | Galli | |
| 2006/0050526 A1 * | 3/2006 | Ikeda et al. | 362/555 |

* cited by examiner

*Primary Examiner*—Renee Luebke
*Assistant Examiner*—Robert May
(74) *Attorney, Agent, or Firm*—Brinks Hofer Gilson & Lione

(57) ABSTRACT

A LED bulb and light module utilizes a LED light source and directs light therefrom in a manner which improves efficiency and illumination. Ideally, the LED bulb is structured to create a virtual image whereby the efficiency of light directed out of the module is greatly improved, even with a single LED light source. The LED bulb generally includes a light pipe receiving light from the LED light source and guides the light downstream to a downstream portion which redirects the light radially outwardly.

22 Claims, 5 Drawing Sheets

LED REPLACEMENT BULB

FIELD OF THE INVENTION

The present invention relates generally to a light module for a motor vehicle, and more particularly relates to an LED bulb for use in such a light module.

BACKGROUND OF THE INVENTION

Modern automotive light modules typically use a filament bulb as their light source. While such modules have a long and successful history, filament bulbs consume a large amount of power and have a relatively short life. In an attempt to overcome these shortcomings, others have proposed to utilize LED light sources to replace the filament bulbs since LED's consume significantly less power and have a long life span.

Unfortunately, LED solutions also have their drawbacks. In particular, automotive light assemblies utilizing LED light sources typically use a large number LED's, typically eight or more, which thus requires increasing amounts of power over a single LED bulb. Furthermore, these light modules using LED light sources suffer from poor efficiency, that is, the amount of original light from the light source which is actually directed outwardly away from the vehicle to illuminate the surrounding area.

Accordingly, there exists a need to provide an automotive light source which utilizes an LED light source to significantly reduce power consumption, have long life, while at the same time efficiently direct the light to provide adequate illumination.

BRIEF SUMMARY OF THE INVENTION

The present invention provides a LED bulb and light module which utilizes a LED light source and directs light therefrom in a manner which improves efficiency and illumination. The LED bulb is structured to create a virtual image whereby the efficiency of light directed out of the module is greatly improved, even with a single LED light source. The LED bulb generally includes a light pipe receiving light from the LED light source which guides the light downstream along a longitudinal axis. A downstream portion of the light pipe defines a first curved surface and a second curved surface. The second curved surface is spaced radially outward of the first curved surface. The first and second curved surfaces redirect the light radially outwardly to define a virtual image of the LED light source.

According to more detailed aspects, the LED bulb is plastic molded from a clear optical grade material, whereby the aforementioned components are integrally formed. The first curved surface preferably has a parabolic curvature, while the second curved surface has a spherical curvature. Alternatively, the first and second curved surfaces have a numerically developed free-formed curvature. Light reflects off the first curved surface and passes through the second curved surface. The first curved surface is preferably formed in an end surface of the downstream portion of the light pipe, and the end surface further includes a non-reflecting surface positioned along the longitudinal axis to generate a "hot spot". The non-reflecting surface may be a flat surface generally perpendicular to the longitudinal axis, or may include a beam spreading structure or a beam focusing structure.

According to still more detailed aspects, the light pipe includes an upstream portion and a main body linking the upstream portion to the downstream portion. The upstream portion is structured to collimate light from the LED light source and direct the light longitudinally downstream. The upstream portion preferably defines a recess for receiving the LED light source, and includes a lens adjacent the recess for focusing the light longitudinally downstream. An outer surface of the upstream portion is curved to collimate the light.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
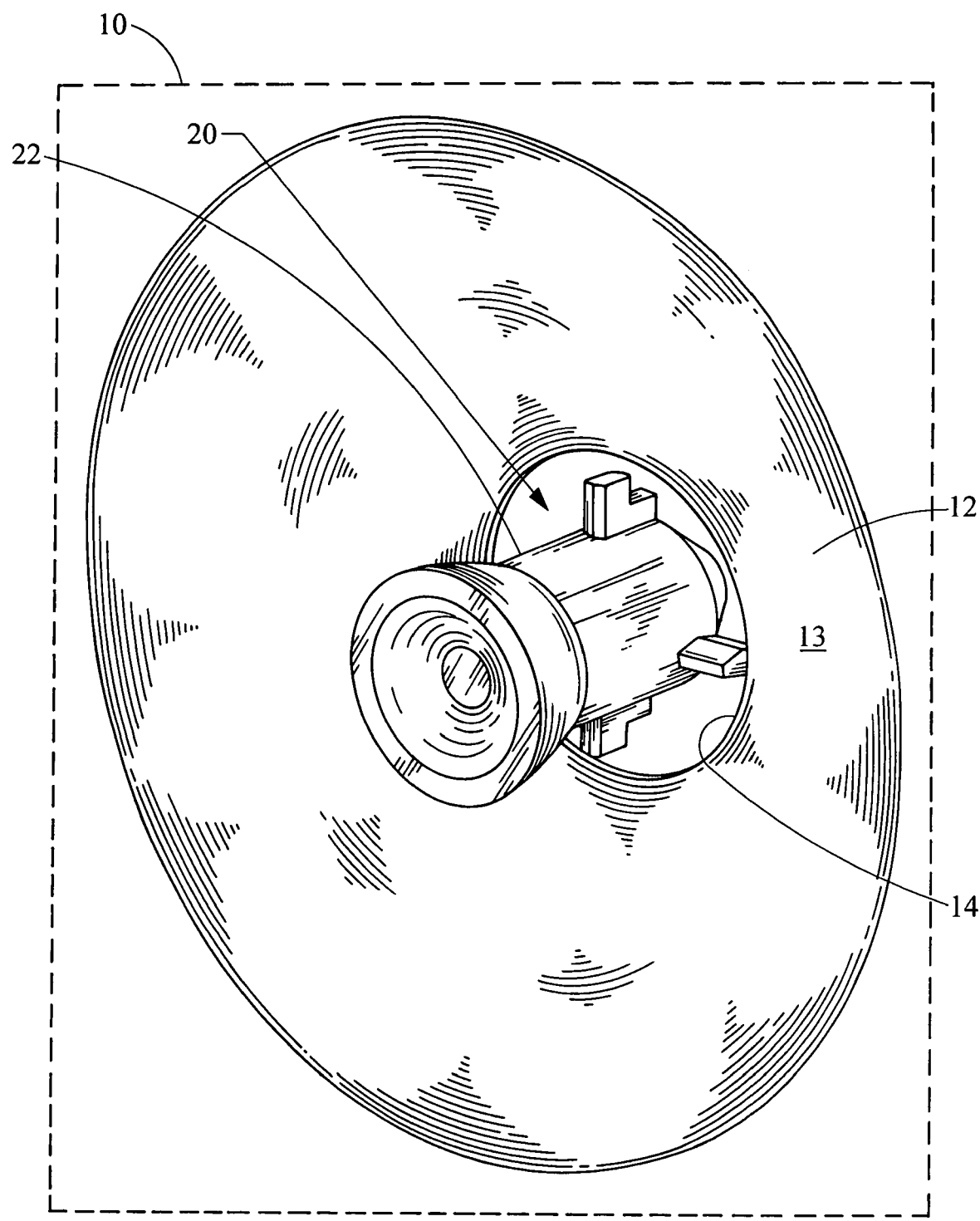
FIG. 1 is a perspective view of an embodiment of a light module for an automobile constructed in accordance with the teachings of the present invention.
Figure 2:
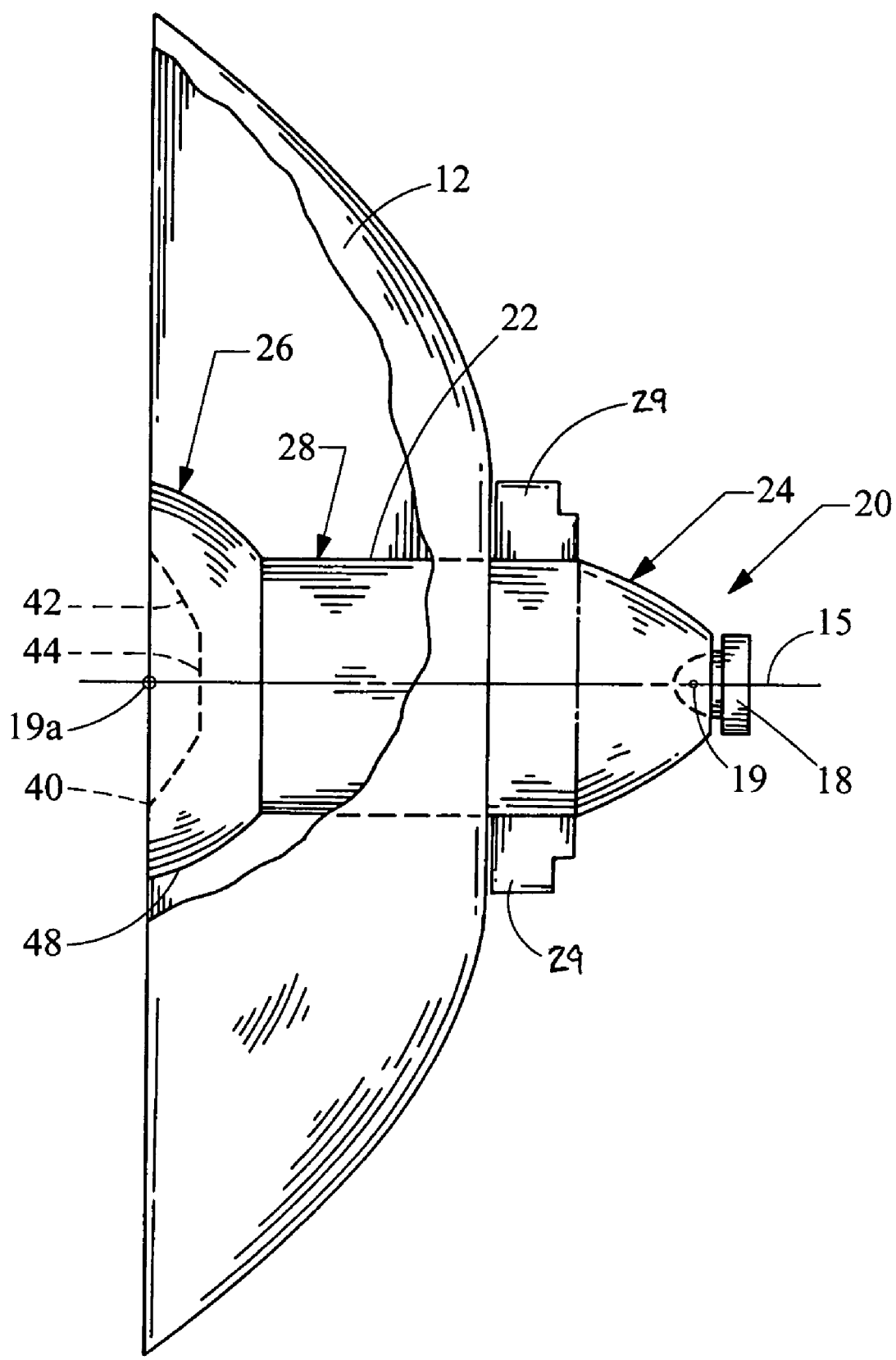
FIG. 2 is a side view of an LED bulb forming a portion of the light module depicted in FIG. 1.

Turning now to the figures, FIG. 1 depicts a perspective view of a light module 10 having a LED bulb 20 constructed in accordance with the teachings of the present invention. Among other things, the light module 10 includes a reflector 12 defining a reflective surface 13 which receives light from the LED bulb 20 and directs the light outwardly away from the vehicle. The reflector 12 includes an opening 14 which receives an LED bulb 20. The bulb 20 is generally defined by a light pipe 22 which extends through the opening 14 in the reflector 12. The light pipe 22 directs light received from a LED light source 18 (FIG. 2).

The details of the LED bulb 20 will now be described with reference to FIGS. 2 and 3. The entire light pipe 22 is generally integrally formed, and preferably is formed by injection molding a clear optical grade material, although it will be recognized that the light pipe 22 may be formed in several parts and through other manufacturing techniques. The material must be capable of conducting light in the visible wave length range, and is preferably a plastic such as acrylic or polycarbonate which allows a molding process to be used for producing the part. The first curved surface 42 is coated with a material which reflects light in the visible wavelength range, typically aluminum. The light pipe 22 directs the light utilizing the principles of total internal reflection, standard reflection, and a number of internal surfaces for collimating, focusing, reflecting and directing the light.

The light pipe 22 generally includes an upstream portion 24 and a downstream portion 26 connected by a body portion 28. Light from the LED light source 18 flows downstream from the upstream portion 24 towards the downstream portion 26, and along a longitudinal axis 15 defined by the light pipe 22. The main body 28 of the light pipe 22 is generally cylindrical in nature, and includes a plurality of flanges 29 attached to its outer surface for connecting the LED bulb 20 to other structural components of the light module 10 or other support structures of the vehicle. The downstream portion 26 of the light pipe 22 includes a first curved surface 42 and a second curved surface 48 for redirecting the light in the light pipe 22 radially outwardly, as will be described in more detail below.

Figure 3:
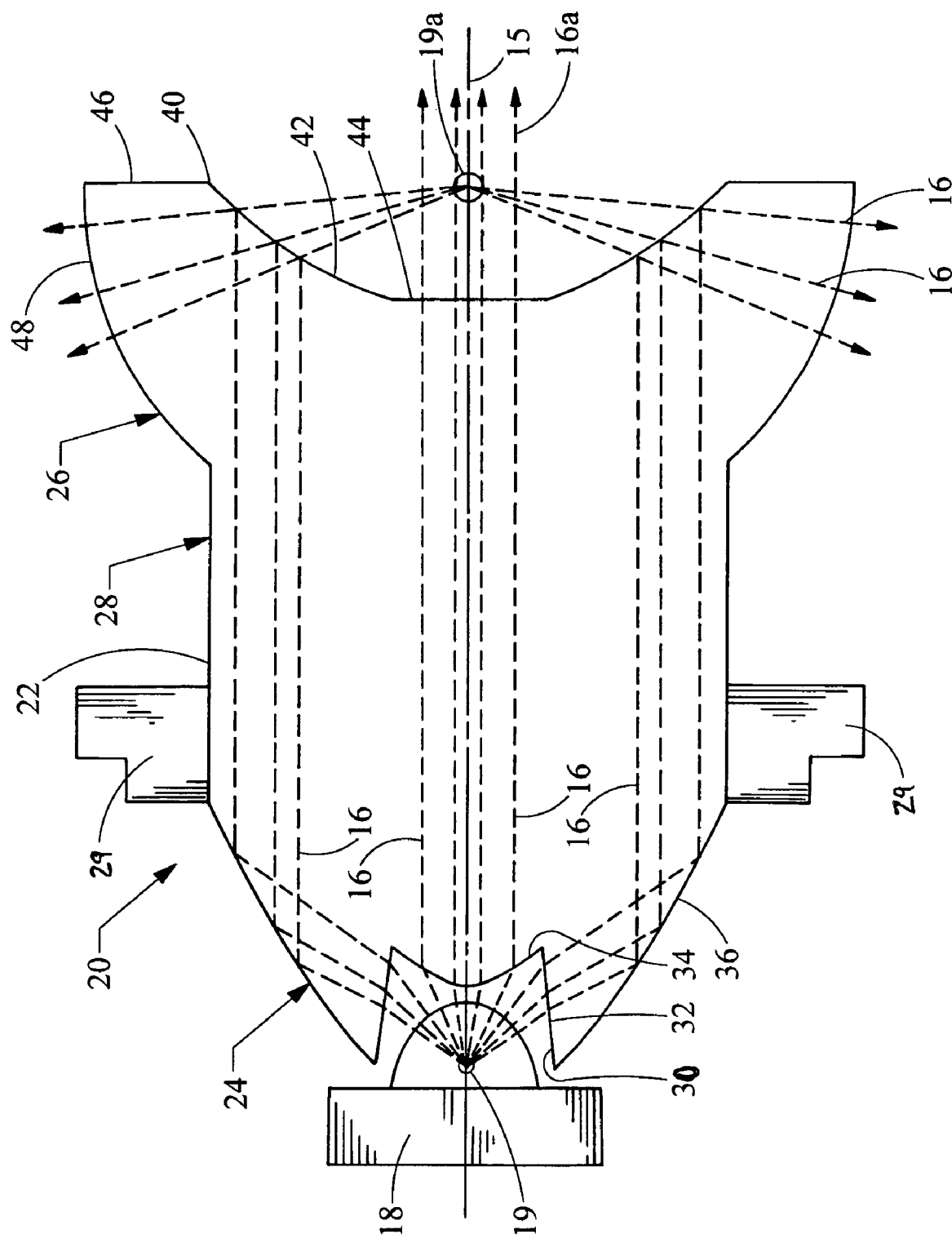
FIG. 3 is a side view of a portion of the light module depicted in FIG. 1.

As shown in FIG. 3, the upstream portion 24 of the light pipe 22 has a tapered shape in the upstream direction, and generally is structured to collimate the light (light rays indicated by various lined arrows 16) from the LED light source 18 and direct the light 16 longitudinally downstream generally parallel with the longitudinal axis 15. By the term generally, it is meant that the light 16 follows a path which is within 3° of parallel to the longitudinal axis 15.

The upstream portion 24 includes a recess 30 for receiving the LED light source 18. The recess 30 is defined by a slightly tapering surface 32 which extends longitudinally and ends at an axially facing surface 34 which is structured as a lens that focuses the light 16 longitudinally downstream. The lens 34, the surface 32 of the recess 40, and the reflecting surface 36 of the tapered upstream portion 24 all cooperate to direct the light 16 from the LED light source 18 downstream and generally parallel to the longitudinal axis 15. As such, the upstream end is structured to act as a collimator, which those of skill in the art will recognize can be formed by various other structures or separate devices known in the art.

The downstream portion 26 of the light pipe 22 is structured to direct the light 16 radially outwardly from the longitudinal axis 15, and form a virtual image of the light source 18, i.e. a virtual focal point 19a. The downstream portion 26 includes an end surface 40 that has a first curved surface 42 defined therein. The first curved surface 42 is coated as mentioned above and, acts as a reflector inside the light pipe 22. In the depicted embodiment, the first curved surface follows a parabolic curvature whereby the virtual image and virtual focal point 19a are formed. This virtual imaging of the LED light source 18 improves efficiency and illumination, as described in the commonly assigned co-pending U.S. application Ser. No. 10/945,321, the disclosure of which is incorporated herein in its entirety.

The end surface 40 also includes a non-reflecting surface 44 positioned along the longitudinal axis 15 to form a "hot spot" as is known in the art, which approximates such hot spots formed by prior light sources such as incandescent bulbs. The non-reflecting surface 44 is positioned at the peak of the first curved surface 42, and by virtue of its angling relative to the longitudinal axis 15 and light rays 16, permits a portion of the light 16a to pass therethrough and directly out the light module 10. In the depicted embodiment, the non-reflecting surface 44 is flat and generally perpendicular to the longitudinal axis 15. A second flat surface 46 is left around the outer periphery of the end surface 40, which generally does not transmit any light 16, except for the occasional incidental light that may occur due to light noise.

Light reflected from first curved surface 42 continues through the light pipe 22 in a direction radially outwardly from the longitudinal axis 15. The outer periphery of the downstream portion 26 of the light pipe 22 defines a second curved surface 48. As the first curved surface 42 creates a virtual focal point 19a, the second curved surface 48 takes a spherical curvature (i.e. circular in a two-dimensional view) so that the light 16 reflected from first curved surface 46 passes through the second curved surface 48 generally undisturbed. It will be recognized by those skilled in the art that the second curved surface 48 may take alternate curvatures, including those refracting the light 16, depending on the desired application of the light module 10.

A brief summary of the passage of light 16 through the LED bulb 20 will now be given with reference to FIGS. 2 and 3. Light 16 is generated by LED light source 18 and originates at a point of origin 19. Some light 16 follows a path through the lens 34 and is directed longitudinally downstream as shown. The remainder of the light 16 passes through the recess surface 32 and is reflected by the free form curved surface 36 of the upstream portion 24. Thus, the upstream portion 24 collimates the light 16 and directs the same longitudinally downstream through the body portion 28. The collimated light rays 16 continue longitudinally downstream until they encounter the end surface 40 of the downstream portion 26. Light 16 close to the longitudinal axis 15 strikes the flat (non-reflecting) surface 44 and passes directly therethrough to generate the "hot spot". Light 16 spaced more radially outwardly strikes the first curved surface 42, and is reflected radially outwardly, and back upstream through second curved surface 48. It can be seen in FIGS. 2 and 3 that the light rays 16 exiting the downstream portion 26 of the light pipe 22 are directed towards the reflector 12 and its reflective surface 13 for further redirection of the light rays 16 out of the light module 10 and away from the motor vehicle.

It can also be seen from FIG. 2 that the downstream portion 28 of the LED bulb 20 is positioned in front of the reflective surface 13 (FIG. 1), while the upstream portion 24 extends through the aperture 14 and is positioned behind the reflector 12. Stated another way, the virtual image and focus point 19a needs to be positioned in front of the reflector 12, allowing the true LED light source 18 to be positioned outside of the cavity and behind the reflector 12. The virtual image and source point 19a is positioned in front of me reflector to direct light toward the reflective surface 13.

Figure 4:
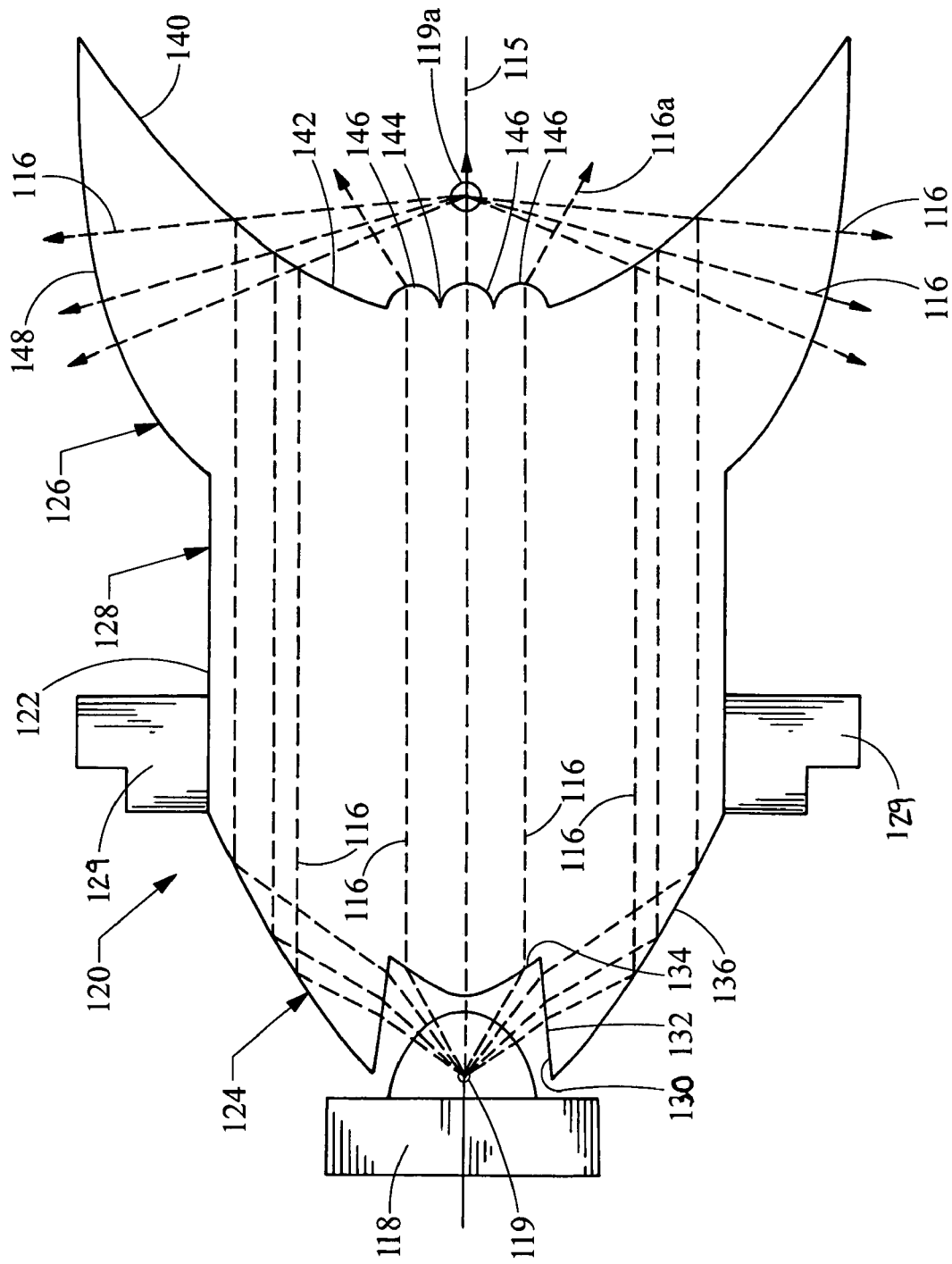
FIG. 4 is a side view of an alternate embodiment of the LED bulb depicted in FIGS. 1 to 3.

Turning to FIG. 4, another embodiment of an LED bulb 120 includes a light pipe 122 having an upstream portion 124, a downstream portion 126 and a main body portion 128. As in the prior embodiment, the upstream portion 124 includes a recess 130 for receiving an LED light source 118 emitting light 116 from a point of origin 119. The upstream portion 124 is structured to collimate the light 116 by virtue of the angled wall 132 and lens 134 of the recess 130, and the curved outer surface 136 of the upstream portion 124. Flanges 129 on the main body 128 can be used to mount the LED bulb 120. As in the prior embodiment, the downstream portion 126 includes an end surface 140 defining a first curved surface 142, while a second curved surface 148 cooperates with the first curved surface 142 to create a virtual image of the LED light source 118 and a small virtual focal area 119a.

However, in the embodiment depicted in FIG. 4, the first and second curved surfaces 142, 148 follow a free-form curvature. That is, the curvatures are numerically generated, and may not correspond to any equation. Ideally, the first curved surface 142 is structured to redirect the light 116 in a manner to create a small virtual focal area 119a, while the second curved surface 148 is given a curvature which permits the reflected light 116 to pass directly therethrough with little to no refraction. However, it will be recognized by those skilled in the art that the free-form curvatures of the first and second curved surfaces 142, 148 may collectively generate a small virtual focal area 119a. Still further, the first and second curved surfaces 142, 148 need not generate a virtual image or a small virtual focal area 119a, so long as a substantial portion of the light from the LED light source 118 is redirected radially outwardly from the downstream portion 126 of the light pipe 122. In this manner, the curvatures of the first and second curved surfaces 142, 148 may be controlled and structured to provide a light distribution that approximates the filament bulb that it is intended to replace. It will therefore be recognized by those skilled in the art that numerous variations and structures of the downstream portion 126 of the LED bulb 120 may be generated to replace numerous types of light sources such as filament and incandescent bulbs, and design for the particular application of the motor vehicle such as head lamps, tail lights, turn lights, interior lights, etc.

It can also be seen in the embodiment of FIG. 4 that the end surface 140 of the downstream portion 126 includes a non-reflecting surface 144 that is positioned along the longitudinal axis 115. Unlike the prior embodiment, a non-reflecting surface 144 includes beam spreading optics, and particularly a plurality of pillows or flutes 146, rather than the flat surface 44 of the prior embodiment. Here, a "hot spot" can still be created, although the light 116 passing directly through the non-reflecting surface 144 can be spread or diffused. It can thus be seen that controlling the structure of the non-reflecting portion 144 permits further variation of the light distribution provided by the LED bulb 120.

Figure 5:
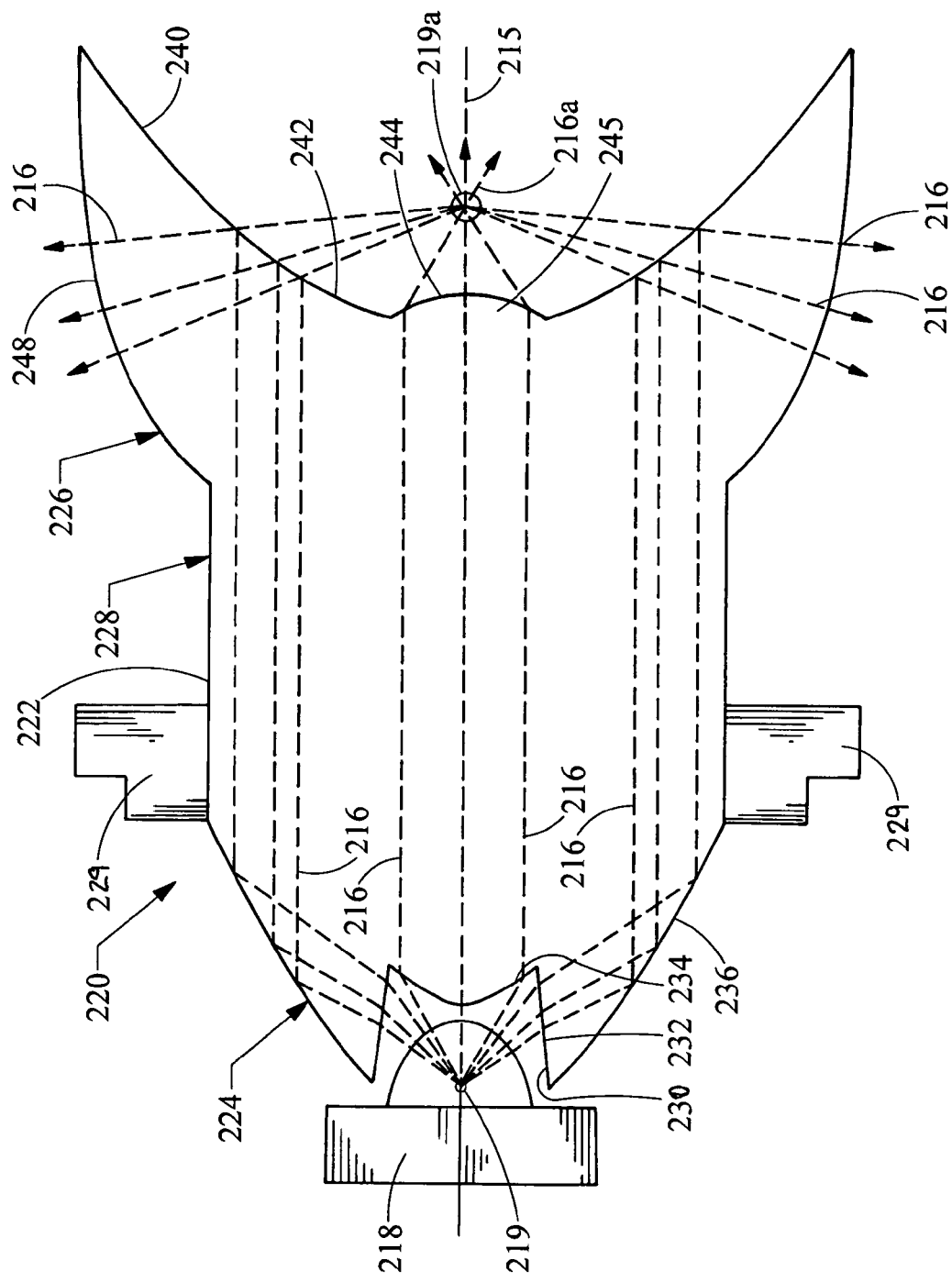
FIG. 5 is a side view of another alternate embodiment of the LED bulb depicted in FIGS. 1 to 3.

Yet another embodiment of a LED bulb 220 is depicted in FIG. 5. The LED bulb 220 includes a light pipe 222 having an upstream portion 224, a downstream portion 226 and a main body portion 228. As in the prior embodiment, the upstream portion 224 includes a recess 230 for receiving an LED light source 18 emitting light 216 from a point of origin 219. The upstream portion 224 is structured to collimate the light 216 by virtue of the angled wall 232 and lens 234 of the recess 230, and the curved outer surface 236 of the upstream portion 224. Flanges 229 on the main body 228 can be used to mount the LED bulb 220. As in the prior embodiment, the downstream portion 226 includes an end surface 240 defining a first curved surface 242 while a second curved surface 248 cooperates with the first curved surface 242 to create a virtual image of the LED light source 218 and a virtual focal area 219a.

As with the embodiment depicted in FIG. 4, a first and second curved surfaces 242, 248 have been depicted as having free-form curvatures that permit variation of the light distribution while still forming a virtual image and focal area 219a. In this embodiment, however, the non-reflective surface 244 includes an optic focusing structure such as a lens. Stated another way, the non-reflecting surface 244 is formed with a curvature to form a lens 245 in the end surface 240 of the light pipe 222. As with the prior embodiments, a "hot spot" may be created while at the same time permitting variation and control over the light distribution to approximate the various light sources the LED bulb 220 is intended to replace.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A LED bulb for directing light from a LED light source, the LED bulb comprising:
    a light pipe receiving light from the LED light source and guiding the light downstream along a longitudinal axis defined by the light pipe;
    a downstream portion of the light pipe defining first curved surface and a second curved surface, the second curved surface spaced radially outward of the first curved surface; and
    the first and second curved surfaces redirecting the light radially outwardly to define a virtual image of the LED light source.

2. The LED bulb of claim 1, wherein the first curved surface has a parabolic curvature.

3. The LED bulb of claim 1, wherein the second curved surface has a spherical curvature.

4. The LED bulb of claim 1, wherein the first and second curved surfaces have a numerically developed free-form curvature.

5. The LED bulb of claim 1, wherein light reflects off the first curved surface and passes through the second curved surface.

6. The LED bulb of claim 1, wherein the second curved surface is formed in an outer surface of the downstream portion of the light pipe.

7. The LED bulb of claim 1, wherein the first curved surface is formed in an end surface of the downstream portion of the light pipe and includes a reflective coating thereon, and wherein the end surface includes a non-reflecting surface positioned along the longitudinal axis.

8. The LED bulb of claim 7, wherein the non-reflecting surface is a flat surface generally perpendicular to the longitudinal axis to permit light to pass longitudinally therethrough.

9. The LED bulb of claim 7, wherein the non-reflecting surface includes one of a beam spreading structure and a beam focusing structure.

10. The LED bulb of claim 1, wherein the light pipe includes an upstream portion and a main body linking the upstream portion to the downstream portion, the main body having an outer most surface, the second curved surface being spaced radially outwardly relative to the outer most surface of the main body.

11. The LED bulb of claim 10, wherein the second curved surface is defined in an outer surface of the downstream portion.

12. The LED bulb of claim 1, wherein an upstream portion of the light pipe includes a recess for receiving the LED light source.

13. The LED bulb of claim 12, wherein the upstream portion defines a lens adjacent the recess for focusing the light longitudinally downstream.

14. The LED bulb of claim 1, wherein the upstream portion is structured to collimate light from the LED light source and direct the light longitudinally downstream.

15. The LED bulb of claim 14, wherein an outer surface of the upstream portion is curved to collimate the light.

16. The LED bulb of claim 1, wherein the light pipe is molded from a clear optical grade material to define the first and second curved portions.

17. The LED bulb of claim 1, wherein the second surface is curved in the longitudinal direction.

18. A light module for an automobile, the light module comprising:

a reflector defining a reflective surface receiving light from in front of the reflector and directing the light outwardly away from the vehicle;

a LED light source positioned behind the reflector;

a LED bulb defined by a light pipe having an upstream portion receiving light from the LED light source and a downstream portion for directing the light towards the reflector, the upstream portion positioned behind the reflector and the downstream portion positioned in front of the reflector; and the downstream portion of the light pipe defining first and second curved surfaces, the first and second curved surfaces positioned relative to one another to define a virtual image of the LED light source that is positioned in front of the reflector.

19. The light module of claim 18, wherein the first curved surface has a parabolic curvature and wherein the second curved surface has a spherical curvature.

20. The light module of claim 18, wherein the first curved surface is formed in an end surface of the downstream portion of the light pipe, and wherein the end surface includes a first flat surface positioned along the longitudinal axis and structured to permit light to pass longitudinally therethrough.

21. The light module of claim 18, wherein the upstream portion of the light pipe is structured to collimate light from the LED light source and direct the light longitudinally downstream.

22. A LED bulb for directing light from a LED light source, the LED bulb comprising:

a light pipe receiving light from the LED light source and guiding the light downstream along a longitudinal axis defined by the light pipe;

a downstream portion of the light pipe defining a first curved surface and a second curved surface, the second curved surface spaced radially outward of the first curved surface, the first curved surface being curved concavely towards the longitudinal axis; and the first and second curved surfaces redirecting the light radially outwardly to define a virtual image of the LED light source.

* * * * *